US010580190B2

(12) United States Patent
S.

(10) Patent No.: US 10,580,190 B2
(45) Date of Patent: Mar. 3, 2020

(54) GRAPH BASED HETEROGENEOUS PARALLEL PROCESSING SYSTEM

(71) Applicant: Westghats Technologies Private Limited, Thiruvananthapuram, Kerala (IN)

(72) Inventor: Jyothis Indirabhai S., Kerala (IN)

(73) Assignee: Westghats Technologies Private Limited, Thiruvananth apuram (IN)

( * ) Notice: Subject to any disclaimer, the term of this patent is extended or adjusted under 35 U.S.C. 154(b) by 0 days.

(21) Appl. No.: 16/160,051

(22) Filed: Oct. 15, 2018

(65) Prior Publication Data
US 2019/0122415 A1 Apr. 25, 2019

(30) Foreign Application Priority Data

Oct. 20, 2017 (IN) .............................. 201741037188

(51) Int. Cl.
*G06T 15/00* (2011.01)
*G06T 1/20* (2006.01)
(Continued)

(52) U.S. Cl.
CPC .......... *G06T 15/005* (2013.01); *G06F 9/3887* (2013.01); *G06F 9/542* (2013.01); *G06F 13/37* (2013.01)

(58) Field of Classification Search
CPC . G06T 15/005; G06T 1/20; G06T 1/60; G06F 13/37; G06F 9/3887; G06F 9/542;
(Continued)

(56) References Cited

U.S. PATENT DOCUMENTS 9,348,560 B2 5/2016 Xie et al.
9,430,807 B2 8/2016 Bourd et al.
(Continued)

FOREIGN PATENT DOCUMENTS

CN 102707952 A 10/2012

OTHER PUBLICATIONS

English Abstract of CN 102707952 A published Oct. 3, 2012.
(Continued)

*Primary Examiner* — Ke Xiao
*Assistant Examiner* — Andrew Shin
(74) *Attorney, Agent, or Firm* — Millen, White, Zelano & Branigan, P.C.

(57) ABSTRACT

A system and method to interconnect heterogeneous compute resources using graph based execution flow for image and video processing is disclosed. The system includes a mix of compute engines (SIMDs, fixed-function pipelines and hardware kernels) which work on pipelined streams of data based on programming instructions and/or configuration data. The nodes act as proxies for compute engines in graph and message based routing system to establish graph based flow control mechanism between these nodes. A message based routing mechanism to assign tasks to heterogeneous compute engines and receive their status in time-multiplexed manner thus allowing compute engines to be reused. A configuration method that allows hardware compute engines are uniquely configured based on graph node thus allows reusability and programming or selecting heterogeneous compute system for physical implementation using simple standard definition file generation method.

8 Claims, 15 Drawing Sheets

(51) Int. Cl.
*G06T 1/60* (2006.01)
*G06F 13/37* (2006.01)
*G06F 9/38* (2018.01)
*G06F 9/54* (2006.01)

(58) Field of Classification Search
CPC ........ G06F 9/52; G06F 9/544; G06F 15/7807; G06F 15/7825
See application file for complete search history.

(56) References Cited

U.S. PATENT DOCUMENTS

| | | |
|---|---|---|
| 9,569,221 B1 | 2/2017 | Chaudhri et al. |
| 9,710,876 B2 | 7/2017 | Taylor |
| 2012/0159513 A1* | 6/2012 | Pakhunov ............... G06F 9/52 719/314 |
| 2016/0093012 A1* | 3/2016 | Rao ........................ G06T 1/60 345/522 |
| 2016/0147571 A1 | 5/2016 | Barrere et al. |
| 2018/0300556 A1* | 10/2018 | Varerkar ............ G06K 9/00771 |

OTHER PUBLICATIONS

L. Schor et al., "Exploiting the Parallelism of Heterogeneous Systems Using Dataflow Graphs on Top of OpenCL", The 11th IEEE Symposium on Embedded Systems for Real-time Multimedia (2013) pp. 41-50.

G.A. Elliot et al., "Supporting Real-Time Computer Vision Workloads Using OpenVX on Multicore+GPU Platforms", IEEE Real-Time Systems Symposium (2015) pp. 273-284.

* cited by examiner

FIG. 1 shows the block diagram of a heterogeneous parallel processing system designed in accordance with the teachings of the present invention
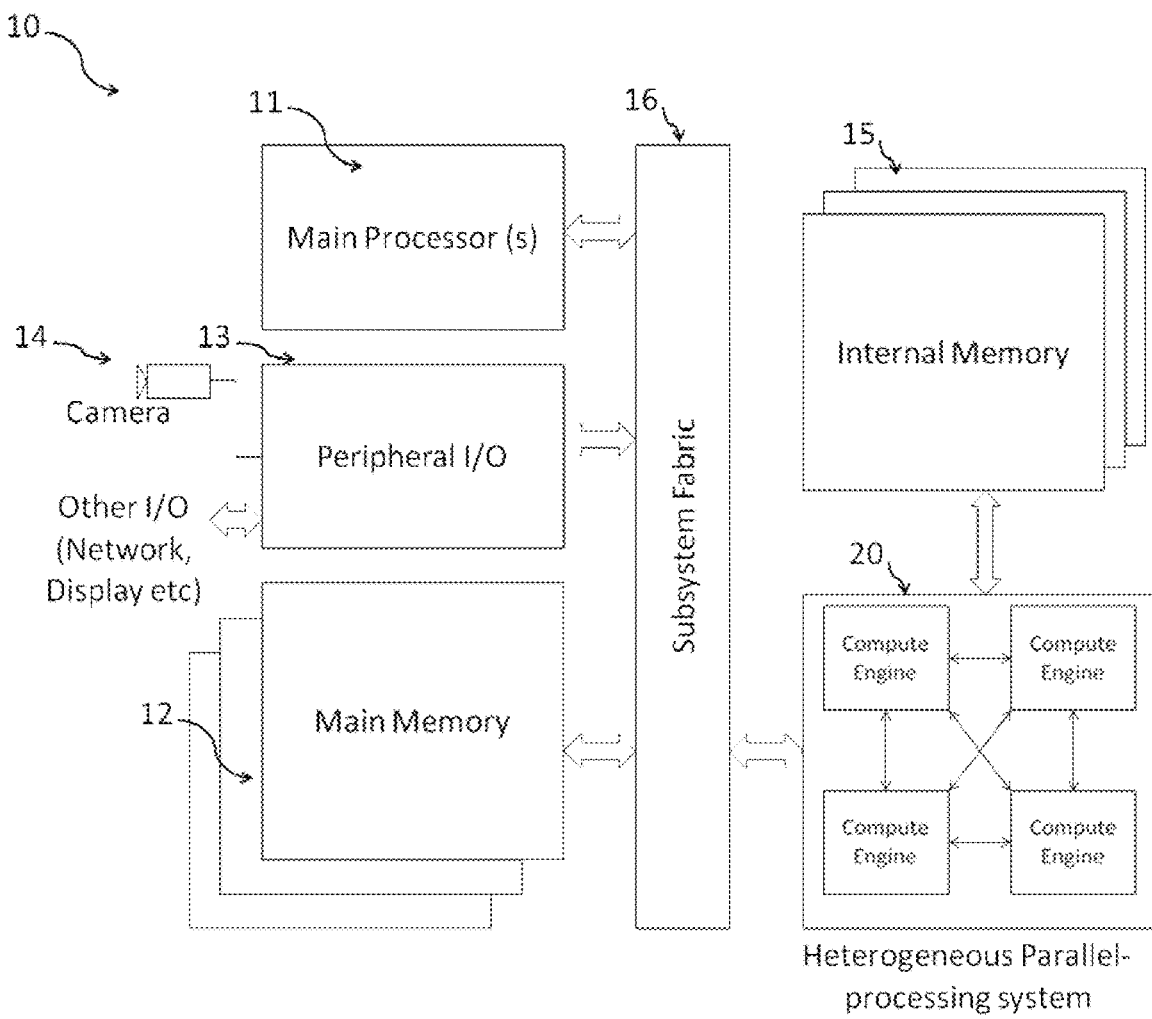

FIG. 2 shows the components of data structure on which graph based pipe line execution
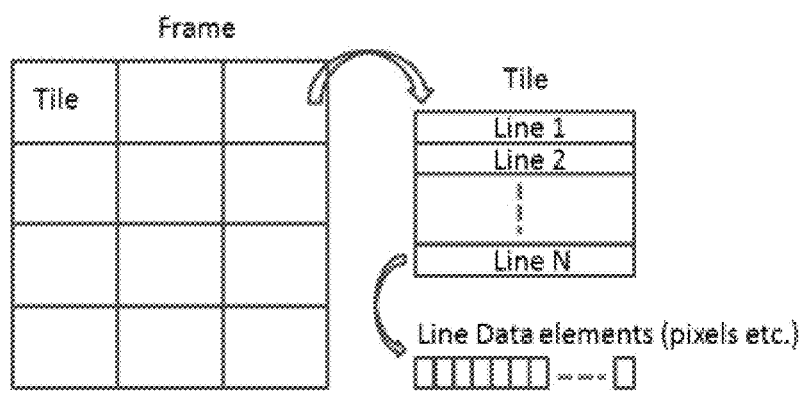

FIG. 3 shows the internal structure of heterogeneous parallel processing system designed in accordance with the teachings of the present invention
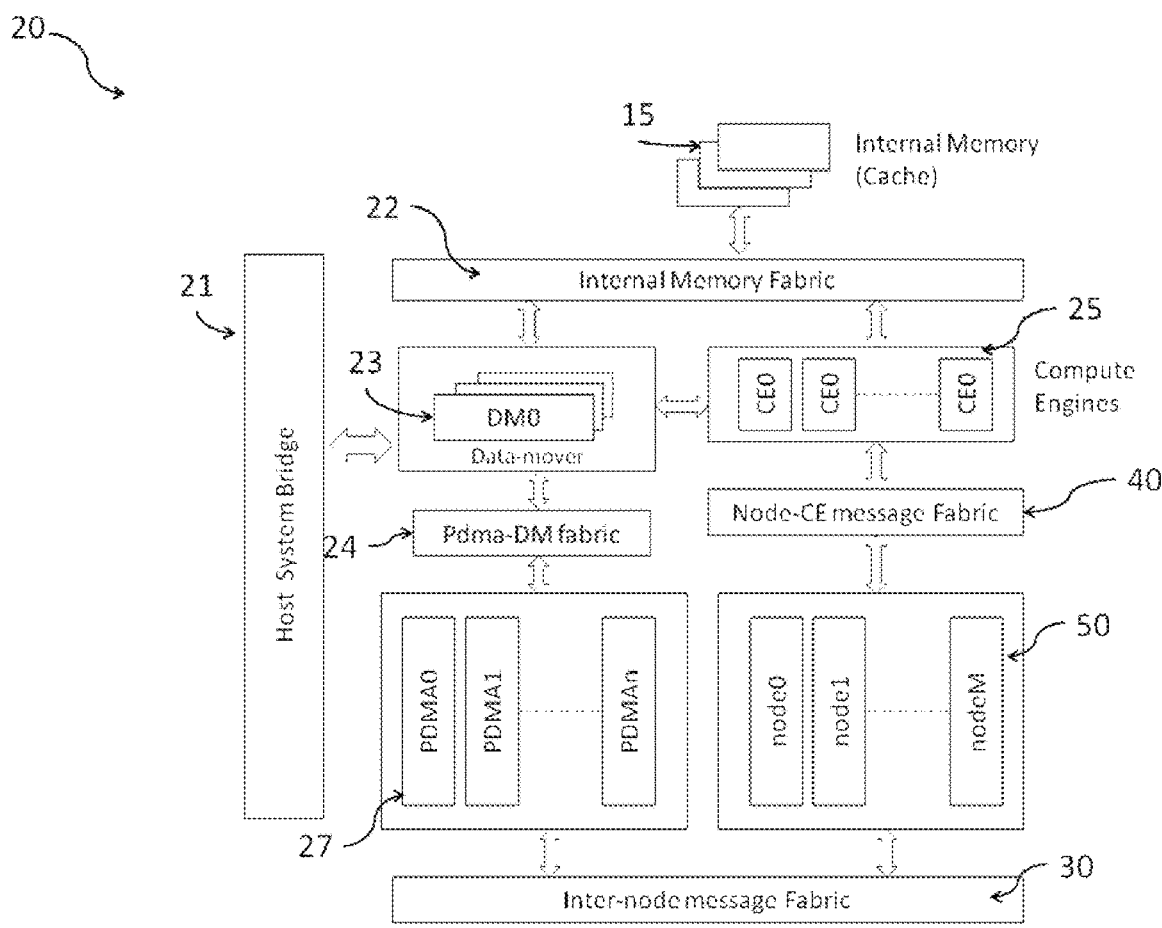

FIG. 4 shows the connectivity of nodes and PDMAs using inter-node message fabric
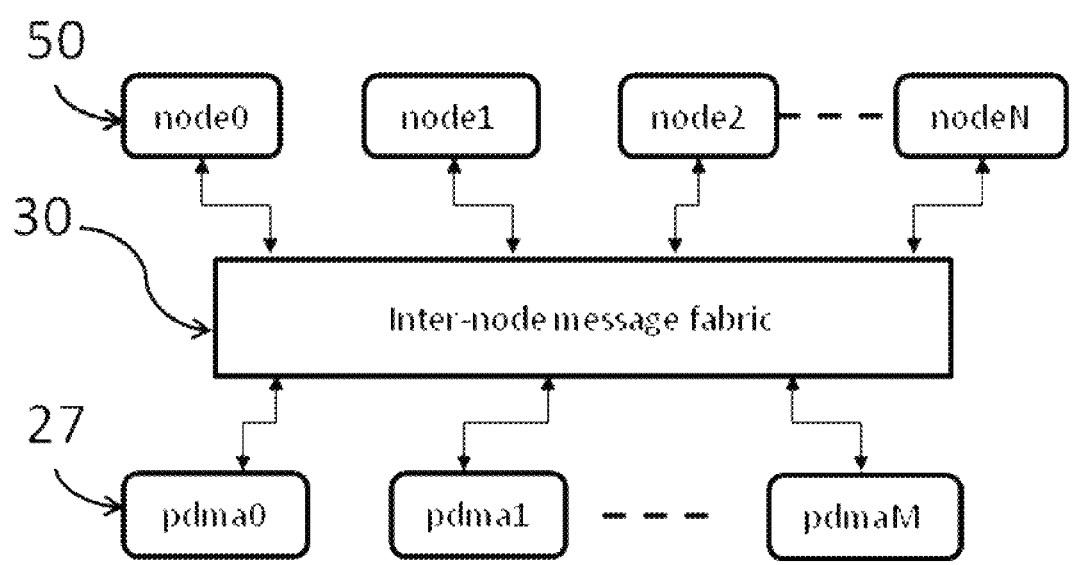

FIG. 5A shows the node structure pertaining to inter-node producer-consumer relation for establishing a graph with the node targeted for its consumers in subsequent stage of pipeline
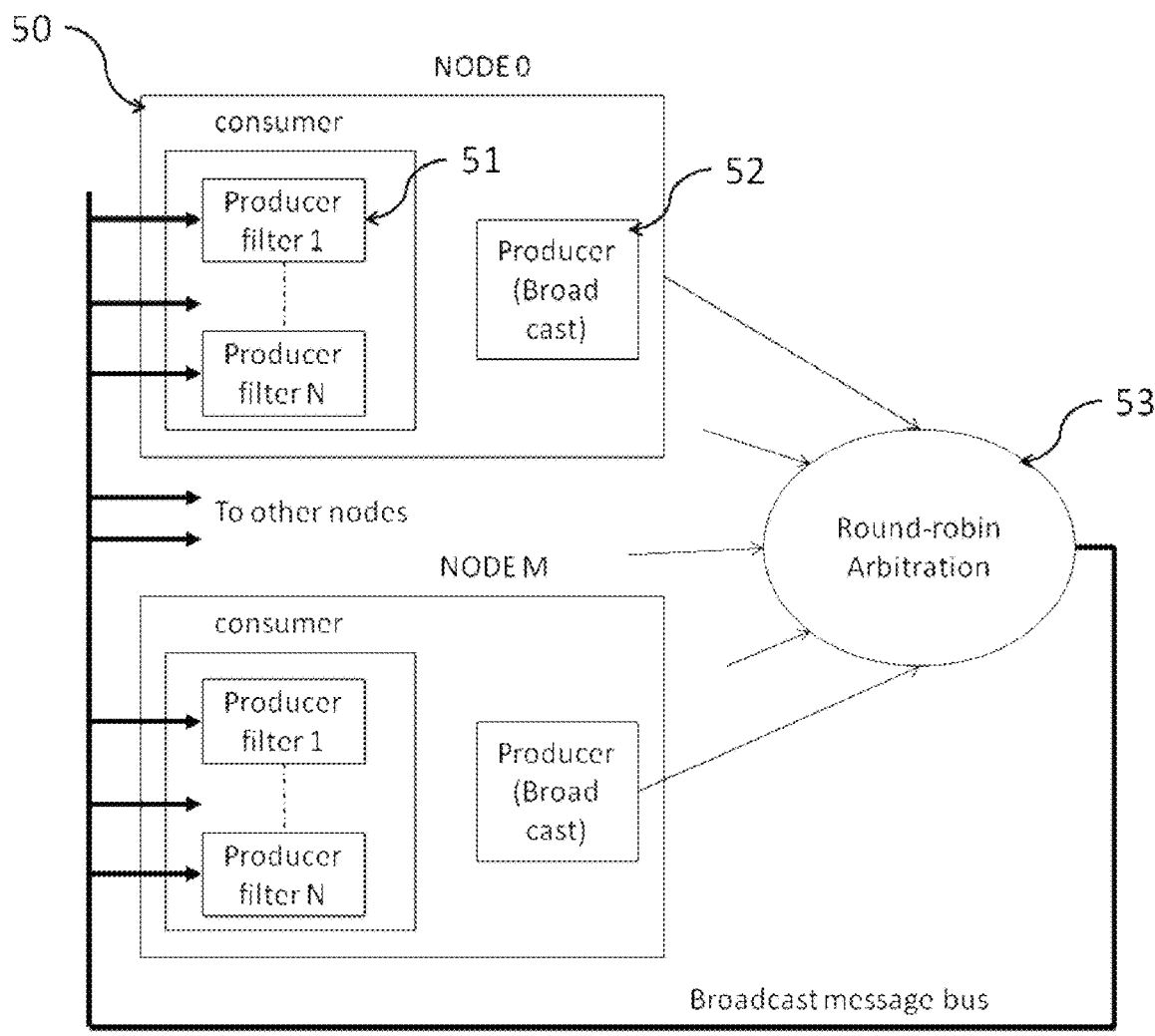

FIG. 5B shows the node structure pertaining to inter-node producer-consumer relation for establishing a graph by associating the node with the producers of the previous stage of pipeline.
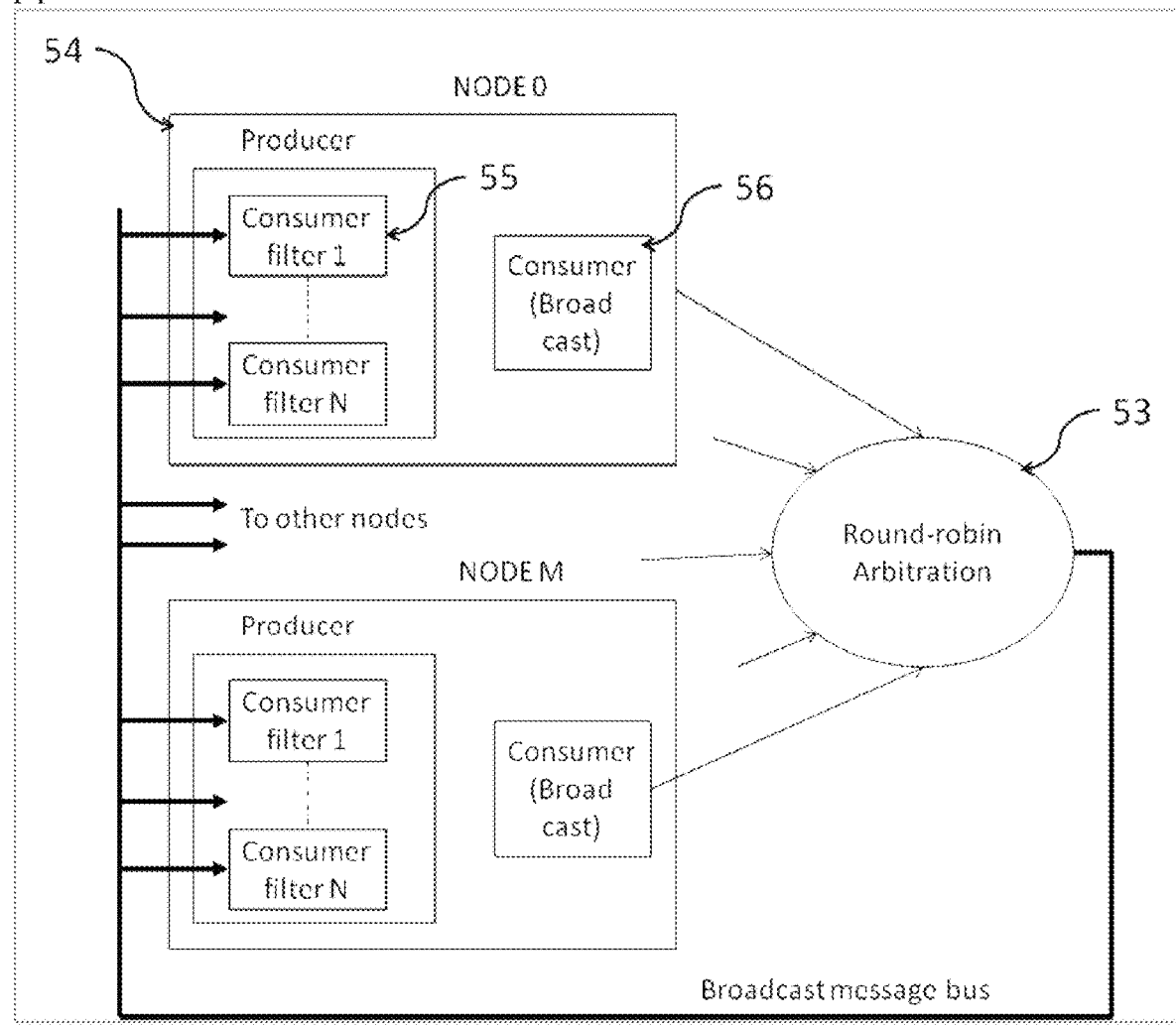

FIG.6 shows the node-node communication of line/block (tile)/frame commit and release
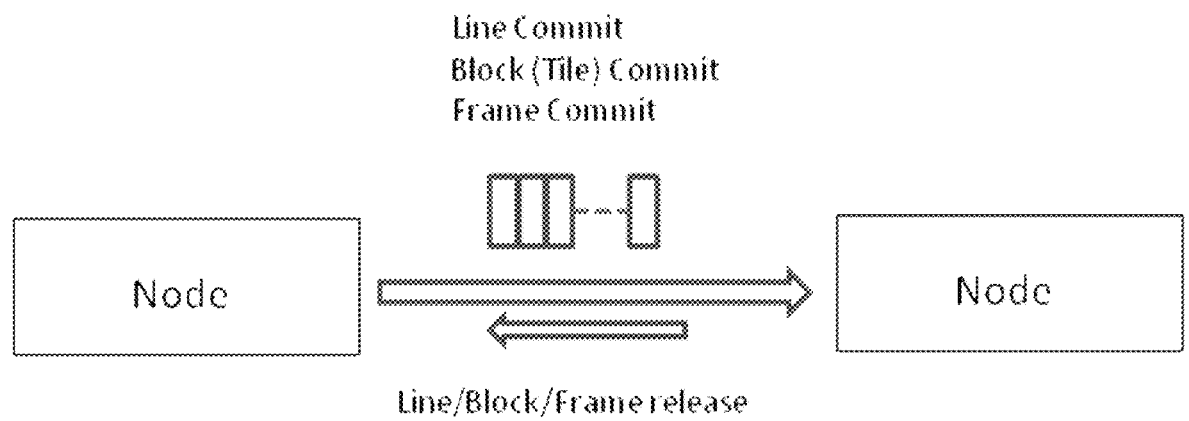

FIG. 7 shows the message format for establishing inter-node relationship in a graph

Commit messages

| Source Node ID | Start of frame | Commit Line | Commit Tile | Commit Frame | Block attributes |
|---|---|---|---|---|---|

Release messages

| Source Node ID | Release Line | Release Tile | Release frame |
|---|---|---|---|

FIG. 8 shows the connectivity of nodes and compute engines (CEs) using node-CE message fabric
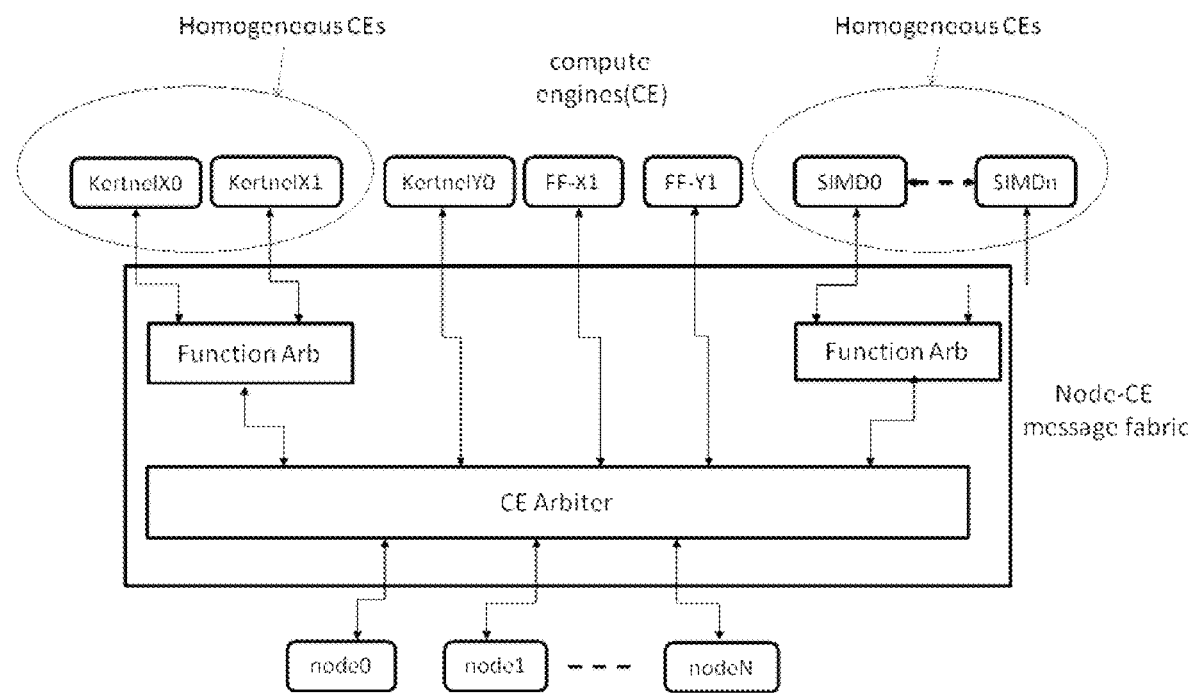

FIG.9 shows the message format for establishing node-CE relationship in a graph
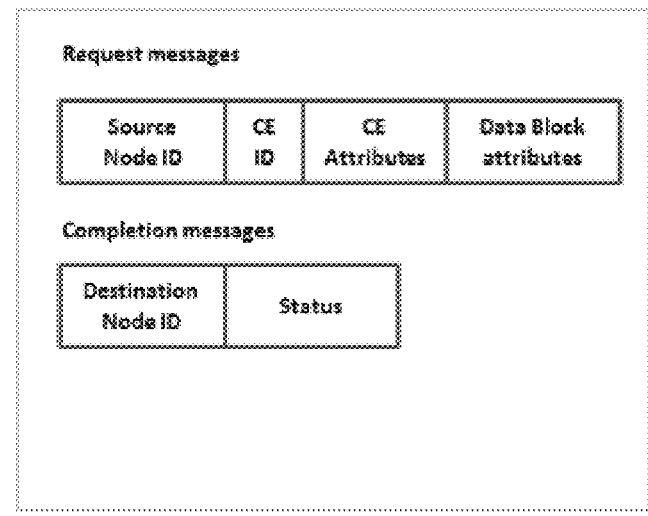

FIG.10 shows the sample graph based heterogeneous data processing flow implementation established through inter-node relation established through configuration, inter-node messages, node-CE messages and node-DMA messages
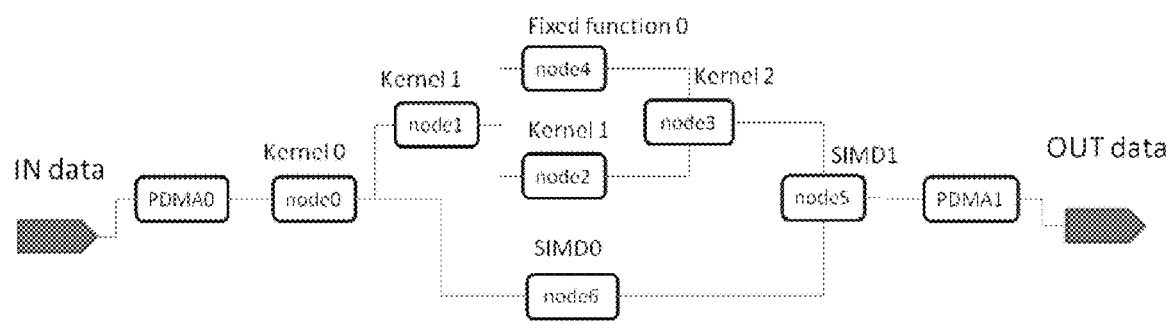

FIG.11A shows the graph based pipe lined execution with Line level granularity
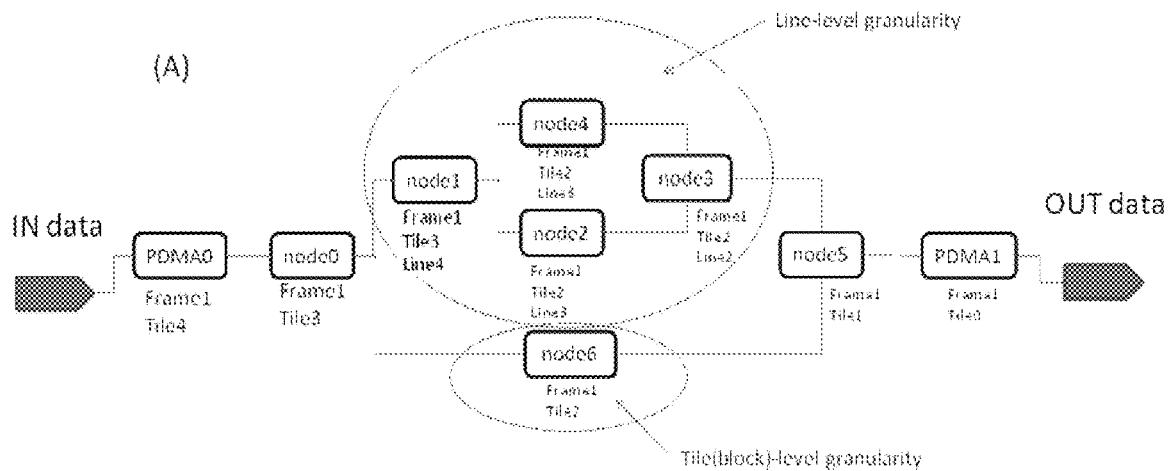
FIG.11B shows the graph based pipe lined execution with Tile(block) level granularity
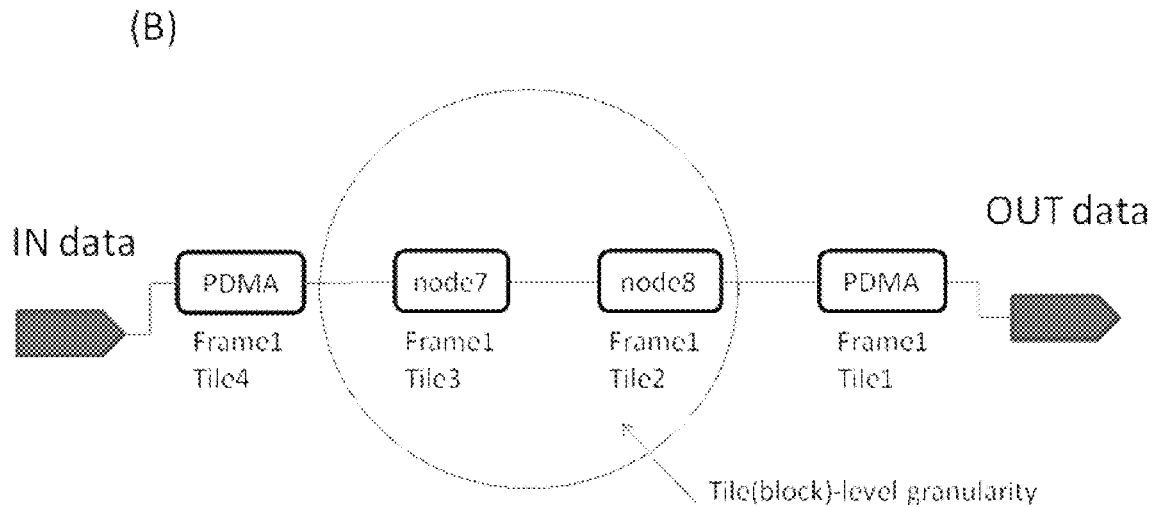
FIG.11C shows the graph based pipe lined execution with Frame level granularity
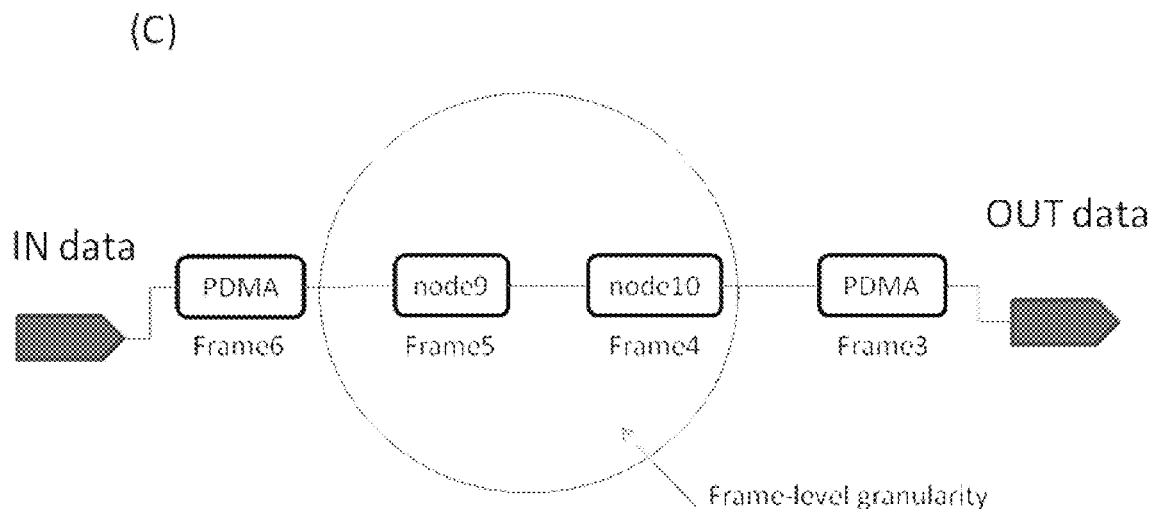

FIG. 12 shows the operational details of graph based pipeline execution flow with different kind of node-CE relationships and Tile/frame sequencing in pipeline stages
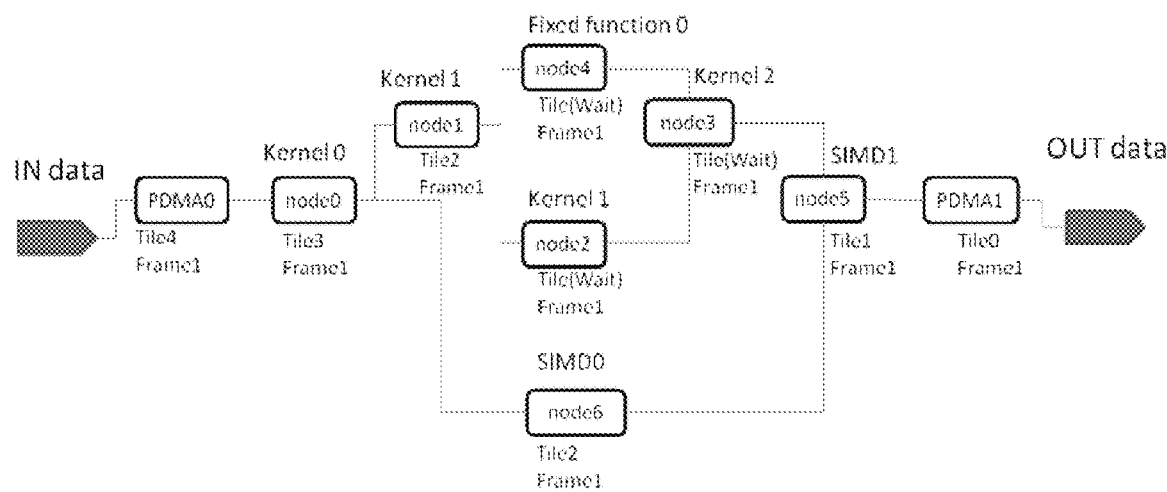

FIG. 13 shows the structure of Kernel/Fixed function/SIMD compute engine
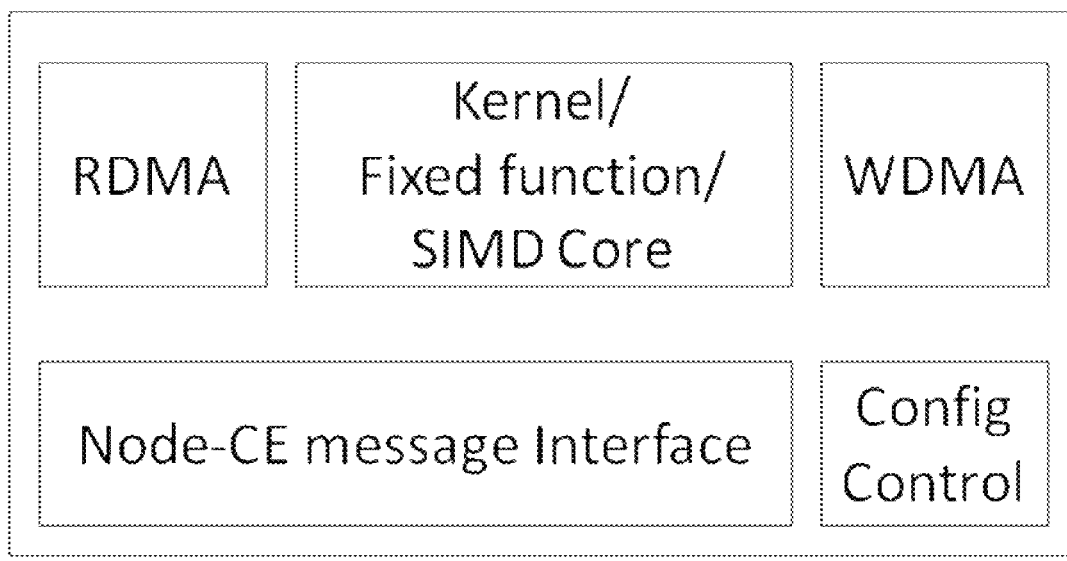

FIG. 14A shows the flow of invention involved in prior art
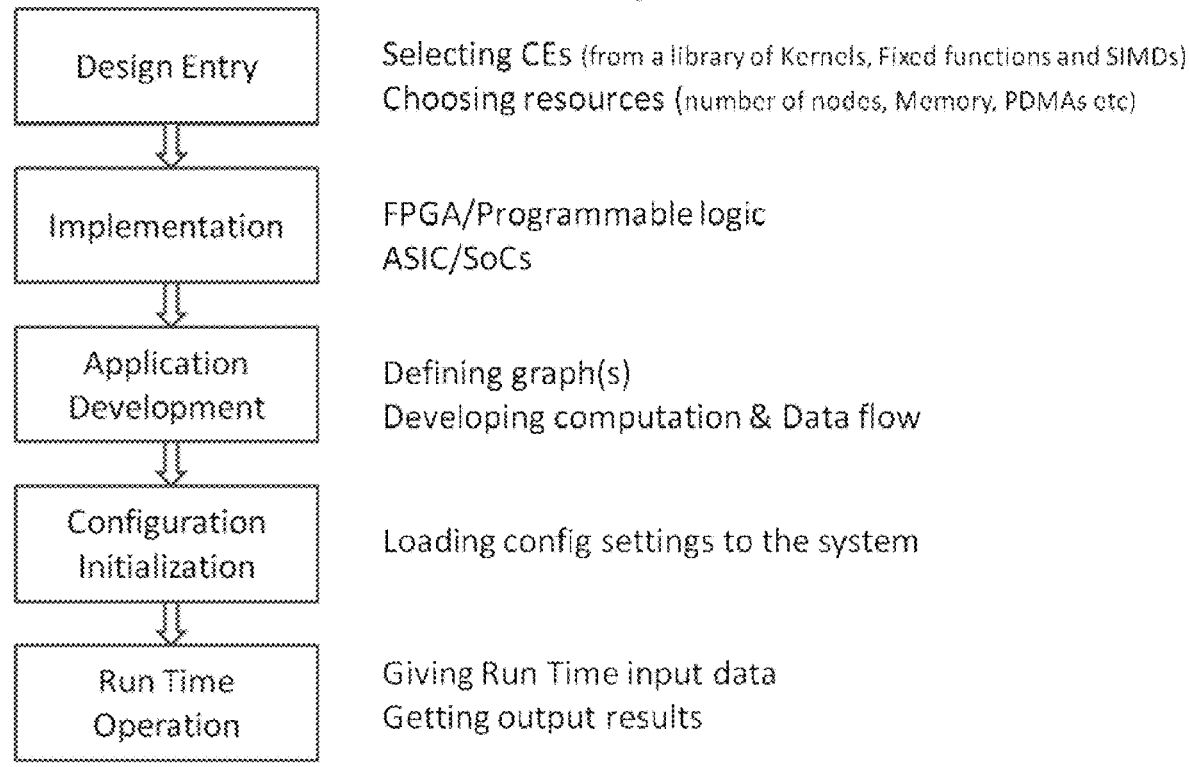
FIG. 14B shows the invention flow involved in the present invention
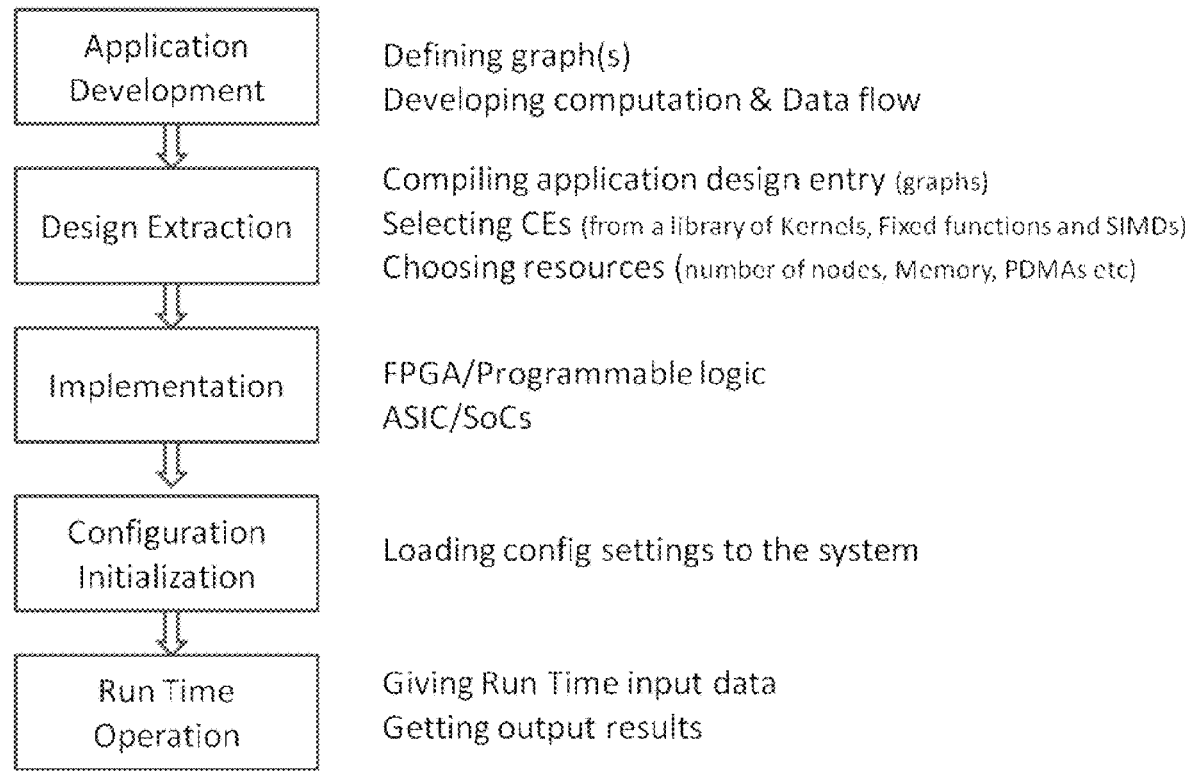

GRAPH BASED HETEROGENEOUS PARALLEL PROCESSING SYSTEM

FIELD OF THE INVENTION

The present invention generally relates to systems and methods for image and video processing. More specifically, the present invention relates to acceleration of image and video processing with the help of hardware based data processing engines that work concurrently with main processor to achieve high degree of parallelism.

BACKGROUND OF THE INVENTION

Unlike generic data processing, image and video processing demands high degree of parallelism. To perform high degree of parallelism, a domain specific knowledge is required to develop a complex computer software. These domain experts focus on the overall performance of the application and lacks knowledge in the system level performance like parallelism or flexibility based on user defined application etc. So, traditional sequential instruction processing as happening in microprocessors is inefficient. This will greatly reduce the processing efficiency. This causes various unwanted results like data loss, low frame rate, delay in image/video analytics results for intelligent decision making, inefficient power usage for applications that demand low power etc.

Conventionally, multiple approaches have been developed to solve these problems. Applying generalization, the approaches falls under three categories. All the three approaches, incorporates a main processor (or processors) for running the main application software, configuring other compute resources and handling the results out of the overall compute system.

First approach is to use non-standard highly parallel hardcoded hardware structures implemented in Application Specific Integrated circuits (ASICs) or System on chips (SoCs) or Field programmable gate arrays (FPGAs) in the form of Register transfer level (RTLs) implementation methods. These RTL generated digital gate design structures work alongside with main-CPUs. This approach directly implements hardcoded data processing structures and achieve very high degree of parallelism. This approach is efficient in terms of performance and power. But it comes with a penalty of losing flexibility and programmability. This scheme lacks capabilities to add heterogeneous compute engines in a plug and play fashion. This requirement is very important in physical implementations such as custom ASICs and Field programmable gate array (FPGA) that allows programmability for application developers by using EDA tools. Now the popular approach in ASICs and FPGAs is to use new or reusable computational blocks by stitching them together using RTLs or by using schematic design entry methods. This demands a major design skill from the application developer's point of view to create a suitable ASIC or FPGA design to meet their demand.

Second approach is to use multiple symmetric compute structures like Single Instruction Multiple Data (SIMD) or Very long instruction word (VLIW) processors to work in parallel to achieve certain degree of parallelism. The SIMDs and VLIWs work alongside with main main-CPU. This approach is simple in programming model point of view but inefficient in terms of parallelism. Considering the nature of image data volume and organisation, the requirement of number of SIMDs and VLIWs could be very high to achieve reasonable frame rates. The communication between processors and sharing data between the processors is through interrupts and traditional inter-processor communication mechanisms like mail box and often results in performance bottlenecks due to communication overhead and programming complexity.

Third approach to this problem is to use a mixed approach. Here, main-CPUs and SIMDs/VLIWs coexist along with fixed pipeline of hardware block specialised to do certain tasks efficiently. SIMDs solves the problem of programmability and flexibility while fixed function pipeline blocks help to achieve image/video specific high degree parallelism for certain functions (e.g. convolution). This approach solves majority of the issues related to image/video processing.

Though this third approach is efficient compared to the other two approaches, most of the implementations of this approach are based upon using data flow based on traditional inter-processor and inter fixed-function communications. The main processor(s) or SIMD/VLIWs processors use fixed-function pipelines (hardware) for specific tasks. Because of this rigid communication and dataflow management, the implementation of combining the fixed-functions and SIMDs/VLIWs limit the overall performance of the system. This is also an inefficient approach in terms of silicon area and power utilization point of view. Further, this scheme lacks capabilities to add heterogeneous compute engines in a plug and play fashion for an FPGA or ASIC hardware implementation.

Typical GPUs (graphics processor units) are using SIMD/VLIW based parallel processing. Intel & NVIDIA GPUs are examples. But their communication flow and methods are more general purpose or targeted for graphics type of data processing. Most of them address SIMD to SIMD direct relationship and traditional communication schemes (mailbox, interrupt etc.) to achieve parallel processing. Image/Video processing is more compute intensive and nature of data (arranged like a 2 dimensional array in main memory) is different as compared to graphics processing. So, it demands a completely different approach. There are some new image processing architectures that try to include some fixed function blocks (image processing functions) along with SIMDs/VLIW and create some communication methods to achieve high performance. But they also having disadvantages as programming models are still very restrictive and not able to achieve the amount of parallelism that image/video processing demands. Another approach is using FPGAs or ASICs to address high performance requirements of the computation. Now, the popular approach is to use new or reusable computational blocks by stitching them together by using RTLs or schematic design entry methods. But main lapse in this approach is, it demands a major design skill from the application developers side to create a suitable design to meet their demand.

Many system and methods are known in the existing art that uses graph based execution for heterogeneous compute resources of image or video processing to achieve. U.S. Pat. No. 9,710,876 to Stewart N. Taylor, entitled "Graph-based application programming interface architectures with equivalency classes for enhanced image processing parallelism" deals with an image graph executor, which schedules the heterogeneous hardware resources in parallel. The heterogeneous devices having different instruction set architectures. Here, the pipeline of image processing operations are performed with different instruction set architectures. In this art, a mechanism is used for implementing graph on the heterogeneous hardware resources. The graph executor optimizes the tile of an image.

U.S. Pat. No. 9,348,560 to Binglong Xie et al., entitled "Efficient execution of graph-based programs" deals with the heterogeneous hardware resources using graph based execution for image/video processing. A mix of various processing units such as RICA is used for parallel computing process based on programming. This program is based on the graph associated with the parallel hardware configuration. Programming the heterogeneous hardware resources for physical implementation such as FPGA, ASIC using computer files (e.g., RTL, GDSII, GERBER, etc.) provided to fabrication handlers.

U.S. Pat. No. 9,569,221 to Apoorv Chaudhri et al., entitled "Dynamic selection of hardware processors for stream processing" deals with the heterogeneous parallel computing systems processing streams of data using graph based execution. Here, the SoC have multiple hardware processors such as SIMD, hardware kernels. In order to perform complex tasks that require sequences of analytical and processing operations, stream processing tools may be logically arranged in sequences referred to as processing pipelines or tool chains.

U.S. Patent Application No. 20160147571 to Rèmi Barrere et al., entitled "Method for optimizing the parallel processing of data on a hardware platform" deals with the system that includes plurality of processing units. An application graph defining the processing of data on the plurality of processing units. The parallel processing of data is optimized by programming code instructions. The hardware platforms communicate using message passing. These programming code instructions implemented on the hardware platform.

U.S. Pat. No. 9,430,807 to Alexei V. Bourd et al., entitled "Execution model for heterogeneous computing" deals with the graph based pipeline execution topology in heterogeneous computing systems for image/video processing. The heterogeneous computing includes GPU configuration that includes SIMD, hardware kernels. The processor receives an indication of pipeline topology and generates instructions to GPU for execution.

U.S. Patent Application No. 20160093012 to Jayanth N. RAO et al., entitled "Method and apparatus for a highly efficient graphics processing unit (GPU) execution model" deals with the heterogeneous cores have plurality of child workloads interconnected in a logical graph structure for image/video processing. The compute engines includes SIMD, pipeline and kernels. This graphics pipeline is configured based on the pipeline control commands. Message passing is done among the major components of the graphics engine. These codes and data are stored in the hardware unit for executing work.

Chinese Patent Application No. 102707952 to Zhou Jun et al., entitled "User description based programming design method on embedded heterogeneous multi-core processor" deals with a heterogeneous multi-core processor with different processor cores that has task relation graph (directed acyclic graph (DAG) for task execution. The parallelism in heterogeneous multi-core processor is based on kernel frame code. There is a message queue communication between the task and heterogeneous multicore processors has an embedded programming based on user description.

PCT application No. 2016177405 to Natan Peterfreund et al., entitled "Systems and methods for transformation of a dataflow graph for execution on a processing system" deals with a heterogeneous system that includes SIMD and has data flow graph for processing where parallel execution of process based on dataset. The data flow graph of a computer program is implemented on processor.

A non-patent literature "Exploiting the Parallelism of Heterogeneous Systems using Dataflow Graphs on Top of OpenCL" to Lars Schor et al., relates to a heterogeneous system includes SIMD, kernels has synchronous dataflow graphs for video processing where parallel execution of process based on program and this high-level programming framework is implemented on heterogeneous system.

A non-patent literature "Supporting Real-Time Computer Vision Workloads using Open VX on Multicore+GPU Platforms" to Glenn A. Elliott et al., relates to a heterogeneous hardware platform with pipeline architecture and kernels has graph-based computation and this pipeline execution is based on software. The graph based software architecture designed on heterogeneous platforms.

Though the existing systems and methods relates to heterogeneous systems that uses a graph based dataflow execution for image/video processing in parallel. The parallel processing of data is optimized by programming code instructions. But none of the prior art discloses about the nodes which acts as proxy at intermediate stages between compute engines. Also, none of the prior art discloses about the reusability of compute engines.

Hence, a need exists in the art for a system or technique for efficiently utilizing silicon to achieve high performance at low power without compromising on flexibility and programmability The present invention proposes a system and method to achieve graph based execution flow for image and video processing. The inventive system comprises a scheme to interconnect heterogeneous compute resources in a user programmable graph based data flow, reusing compute resources by time multiplexing and context switching. During this time, a commit and release messages are generated to intimate the start and stop of the particular instruction to increase reusable capability of compute engines.

SUMMARY OF THE INVENTION

An objective of the present invention is to provide a system and method to interconnect heterogeneous compute resources using graph based execution flow for image and video processing.

According to the present invention, the system comprises a scheme to interconnect heterogeneous compute resources in a user programmable graph based data flow, reusing the compute resources by time multiplexing and context switching.

The heterogeneous compute system includes a mix of compute engines such as SIMDs/VLIW, fixed-function pipelines and hardware kernels. These compute resources work on pipelined streams of data that are presented to them based on programming instructions and/or configuration data. The nodal units (or nodes) work as producers and consumers of intermediate data in a data flow graph, acting as proxies for compute engines in the graph. A message based routing system that helps to establish a graph based flow control mechanism between these nodes. These nodes of graph can have single/multiple inputs/outputs based on configuration settings done by the main processor. An inventive message based routing mechanism that helps nodes to assign tasks to heterogeneous compute engines and receiving their status in a time-multiplexed manner, thus allowing compute engines to be reused N number of times as part of multiple graphs. A configuration method that allows hardware compute engines to be uniquely configured based on the graph node that assigns tasks to it, thus allowing seamless reuse. The system includes a set of DMAs that moves data between main processor's off-chip memory (main memory) and on-chip cache memory by reusing data movers based on the flow control by the nodes. An input/output (IO) method for the heterogeneous compute engines to grab input data and store output data from/to the internal memory. A method of programming or selecting the heterogeneous compute system for the purpose of physical implementation such as FPGA and ASICs using a simple standard definition file generation method. A method to setup compute engines, nodes and DMA resources for the purpose of seamless reuse, performance and power efficiency.

According to the present invention, the system and method of the present invention comprises the steps of: (A) different types of graph based execution pipelines are created using a group of homogeneous node blocks that act as proxy for the heterogeneous compute engines; (B) a communication scheme between nodes to establish graph like relationship in data movement; (C) data flow control scheme between these proxy nodes to aid pipelined processing with several compute engines work simultaneously on pipelined streams of data; (D) a scheme/instruction to share compute engines within same execution graph or between different graphs thereby allowing reuse; (E) method to work on various granularities of data by changing granularity between intermediate stages of the execution pipeline; (F) scheme to share DMAs as part of multiple graphs; (G) method to configure and program DMAs, nodes and compute engines to work concurrently during run time execution; (H) method for compute engines to get their instructions and data based on the context or the nodes requesting computation; and (I) method of gathering physical implementation requirements from the application developer's design entry information.

To achieve the above mentioned objective, the present invention provides a simple, but powerful parallel execution pipeline generation. The system allows high degree of parallel processing with minimal programming overhead and complexity.

The objective and advantages of the present invention will become more evident from the following detailed description when taken in conjunction with the accompanying drawings.

BRIEF DESCRIPTION OF THE DRAWINGS

The objective of the present invention will now be described in more detail with reference to the accompanying drawings, in which:

FIG. 1 shows the block diagram of a heterogeneous parallel processing system designed in accordance with the teachings of the present invention;

FIG. 2 shows the components of data structure on which graph based pipe line execute;

FIG. 3 shows the internal structure of heterogeneous parallel processing system designed in accordance with the teachings of the present invention;

FIG. 4 shows the connectivity of nodes and PDMAs using inter-node message fabric;

FIG. 5A shows the node structure pertaining to inter-node producer-consumer relation for establishing a graph with the node targeted for its consumers in subsequent stage of pipeline;

FIG. 5B shows the node structure pertaining to inter-node producer-consumer relation for establishing a graph by associating the node with the producers of the previous stage of pipeline;

FIG. 6 shows the node-node communication of line/block (tile)/frame commit and release;

FIG. 7 shows the message format for establishing inter-node relationship in a graph;

FIG. 8 shows the connectivity of nodes and compute engines(CEs) using node-CE message fabric;

FIG. 9 shows the message format for establishing node-CE relationship in a graph;

FIG. 10 shows the sample graph based heterogeneous data processing flow implementation established through inter-node relation established through configuration, inter-node messages, node-CE messages and node-DMA messages;

FIG. 11A shows the graph based pipe lined execution with Line level granularity;

FIG. 11B shows the graph based pipe lined execution with Tile(block) level granularity;

FIG. 11C shows the graph based pipe lined execution with Frame level granularity;

FIG. 12 shows the operational details of graph based pipeline execution flow with different kind of node-CE relationships and Tile/frame sequencing in pipeline stages;

FIG. 13 shows the structure of Kernel/Fixed function/SIMD/VLIW compute engine;

FIG. 14A shows the flow of invention involved in prior art; and

FIG. 14B shows the invention flow involved in the present invention.

REFERENCE NUMERALS

10: System
11: Main processor(s)
12: Main memory(s)
13: Peripheral I/O
14: Camera
15: Internal (cache) memory
16: Sub-system fabric
20: Heterogeneous Parallel processing system
21: Host system bride
22: Internal memory fabric
23: Data mover
24: PDMA-DM fabric
25: Compute engine (CE)
26: PDMA (0, 1 . . . n)
30: Inter-node message fabric
40: Node-CE message fabric
50: Consumer node (0, 1 . . . M)
51: Producer filter (1, 2 . . . N)
52: Producer (commit message)
53: Round robin arbitration
54: Producer node (0, 1 . . . M)
55: Consumer filter (1, 2 . . . N)
56: Consumer (release message)

DETAILED DESCRIPTION OF THE INVENTION

The present invention provides a system and method to interconnect heterogeneous compute resources using graph based execution flow for image and video processing. The system interconnects heterogeneous compute resources in a user programmable graph based data flow, reusing the compute resources by time multiplexing and context switching.

The heterogeneous compute system includes a mix of compute engines such as SIMDs/VLIWs, fixed-function pipelines and hardware kernels. These compute resources work on pipelined streams of data based on programming instructions and/or configuration data set by a main processor. The data flow control blocks(nodes) work as producers and consumers of intermediate data in a data flow graph, acting as proxies for compute engines in the graph. A message based routing system that helps to establish a graph based flow control mechanism between these nodes. An inventive message based routing mechanism that helps nodes to assign tasks to heterogeneous compute engines and receiving their status in a time-multiplexed manner, thus allowing compute engines to be reused several times as part of different graphs working simultaneously. A configuration method that allows hardware compute engines to be uniquely configured based on the graph node that assigns tasks to it, thus allowing seamless reuse. A set of DMAs that moves data between main processor's off-chip memory (main memory) and on-chip cache memory by reusing data movers based on the flow control by the nodes. An input/output (TO) method for the heterogeneous compute engines to grab input data and store output data from/to the internal memory. A method of programming or selecting the heterogeneous compute system for the purpose of physical implementation such as FPGA and ASICs using a simple standard definition file generation method. A method to setup compute engines and DMA resources for the purpose of seamless reuse, performance and power efficiency.

FIG. 1 depicts the block diagram of a heterogeneous parallel processing system designed in accordance with the present invention. In the preferred embodiment, the system (10) is a camera based computer vision processing system. The system (10) includes a main processor(s) (11), a main memory(s) (12), peripheral I/O (13), camera (14), internal (cache) memory(s) (15), subsystem-fabric (16) and a heterogeneous parallel processing system of compute engines (20). The main processor (or processors) (11), main memory(s) (12), peripheral I/O (13), camera (14) and internal(cache) memory(s) (15) are implemented in accordance with the traditional teachings. The main processor (11) implements major functions such as system bring up, configuration of the entire system, main operating system software execution, application software and overall control of the system. The peripheral I/O block (13), implements several I/O functions such as network connectivity, mass storage, display, keyboard/mouse, camera, other sensors etc. Camera(s) (14) acquire visual images (or video) based on application requirements. The camera output may go to main memory (12) or compute engines (25) based on different architectures and capabilities of the system. The main memory(s) (12) is the major volatile storage block of the computer system which holds data to/from various processing and peripheral blocks.

Referring to FIG. 1, the visual data to be processed arrives through camera (14) or other peripherals (13) to the main memory (12). The data in a vision processing system consists of pixels with different kinds of color or monochromatic data formats. This image data is stored in the main memory (12) as a two dimensional frame. In a video case, there is partial, single or multiple frames accrued in the main memory (12) for the purpose of processing. The main memory (12) may also contain intermediate data stored by main processor (11) or by parallel compute engines (25) depending on the data processing storage model. The main processor(s) (11) configures the system by programming a data processing flow pipeline. The main processor (11) also schedules the data for run-time processing by the heterogeneous parallel processing system (20) by exchanging pointers of the data in main memory (12). Then the heterogeneous parallel processing system (20) executes the data based on the data flow pipeline set by the main processor (11) by communicating between them and with the main processor (11) in a pre-programmed manner. The compute engines (25) can be programmed to work directly on the data in main memory (12) or in the internal memory (15).

Referring to FIG. 2, it shows the image data organization in main or internal memory. The input data, intermediate data and final outputs may follow similar structures. The image data is organized as a two dimensional frame with basic element being pixel. The pixel is stored in the main memory with a predefined color format. A group of pixels in X direction forms a line. Similarly several lines in Y direction forms a complete frame. For the purpose of pipelined parallel processing within frame, programmer choose to break down the frame into two dimensional segments called tiles. Thus there are 3 levels of granularity for data called—line, tile and frame. The inputs, intermediate and output data are in the form of two dimensional frame format following the granularities. The compute engines accept the inputs in one of the above granularity and produce results with same granularity. For example if a compute engine receive data as a tile, it produces output data as a tile.

FIG. 3 shows the functional block diagram of an illustrative implementation of the heterogeneous parallel processing system (20) designed in accordance with the present invention. The heterogeneous system (20) consists of internal memory blocks (15), heterogeneous compute engines (25), node units (50), PDMAs (processor DMAs) (26), internal-memory fabric (22), node-kernel message fabric, inter-node message fabric (30) and PDMA-DM message fabric (24). The internal memory (15) is used for temporary storage of data, configuration information and instructions for compute engines. The heterogeneous compute engines (25) include fixed function hardware blocks which implements a mega function, kernel modules which implements specific general purpose micro functions (e.g. convolution) and SIMD/VLIW processors which work based on the instructions programmed for specific applications. The node units (50) are the modules which implements graph pipelines processing flow by acting as a node of a graph based on configuration settings by main processor (11). There are several homogenous node units in a typical system. The nodes (50) are responsible for attaching appropriate compute engine (25) to the execution pipeline and facilitating the data movement by acting like a proxy for the compute engine functionality in the graphic pipeline. The PDMA modules (26) are responsible for data movements between main memory (12) and internal memory (15) based on the commands from the nodes (50).

FIG. 4 of the present invention shows the connectivity of nodes (50) and PDMAs (26) using inter-node message fabric (30) for inter-node communication. The communication between nodes (50) are through a broadcast message channel. Both nodes (50) and PDMA blocks (26) are attached to the same message fabric with a consumer-producer relation. Here, each node has a unique ID.

In accordance with the present invention, FIG. 5 shows an illustrative implementation of the node functionality pertaining to inter-node producer-consumer relation for establishing a data flow graph. The communication between nodes (50) are through a broadcast message channel. All the nodes (50) receive messages through this channel by listening to it. These Nodes (50) arbitrates among them to get access to this message channel. As shown in FIG. 5A, on the producer side (output), the node (50) broadcasts messages to indicate completion of data processing stages by the compute engine (25) associated with the node (50) targeted for its consumers in the subsequent stage of the pipeline. On the consumer side (input) of the subsequent node (nodes), there are producer filters (51) which listen to the broadcast channel and accept messages from nodes (50) that are supposed to be connected to its input ports based on the configuration information set by the main processor (11). Similarly, as shown in FIG. 5B, on the consumer side (input), the node broadcasts messages to indicate completion of data processing stages by the compute engine (25) associated with the node to the previous node (or nodes). On the producer side (output) of the previous node, there are consumer filters (55) which listen to the broadcast channel and accept the messages from nodes (54) that are supposed to be connected to its output ports based on the configuration information set by the main processor (11). This establishes a virtual graph communication flow with associative relationship between nodes (50). This communication mechanism helps to establish execution pipeline data flow management without hard-wiring the hardware gates, thus achieving flexibility and reuse of compute engines (25) and nodes (50).

The DMA (direct memory access) engines are acting as data move controllers for transferring the data between main memory (12) and internal memory (15) based on the commands from nodes (50). In this implementation, there are multiple PDMA modules (26). The PDMAs (26) have producer and consumer interfaces similar to the nodes (50). They are part of the same inter-node message fabric (30) with unique node IDs. Unlike nodes (50), they do not send execution requests to compute engines (25). Instead, they are communicating with data movers (23) for the purpose of data transfer using traditional teachings of data structures and DMAs. The edge nodes (input and output nodes in the far end of the graph) are the nodes (50) initiating data transfer commands to PDMA modules (26). Through configuration, main processor (11) establishing a virtual connection between nodes and PDMA modules (26) and making them as a part of the graph. The edge nodes manage timing of the PDMA commands based on timing derived from the completion of execution by compute engines (25) associated with them.

Referring to FIG. 6, it gives an illustrative representation of the message content between nodes(50). Through the commit messages (52), the node communicates to the next node in the pipeline to start on the data produced (committed) by the current node. Through release messages (56), a node communicate to the previous node that the data consumed by it is processed and the previous node releases the data buffer for other purpose. In this way, a node preserves the data content given to the next node for processing until the next node releases the buffer by returning a release message (56). One of the easiest way of flow control and buffer management is by using a ring buffer orping-pong buffer model. Here, the node fills a memory buffer while the next node's compute engine (25) is working on previously committed buffer. Depending upon the processing data content granularity, some messages may be absent. For example, if the execution is happening based on tile based data exchanges between nodes, line commit/release messages may be absent. Tile(block) and frame commit/release messages is present in such case. In a scenario where a node has multiple fan-ins (inputs), the node waits until it receives set minimal commit messages from all its input nodes before initiating compute request to its associated compute engine.

FIG. 7 shows fields of the messages in inter-node messaging. The message contains source node identifier. There is a unique identifier for each node (50) in the system. This helps node's producer filters (51) to identify the producer of the message and decide whether to accept it or not. Other information include commit (52) and release (56) of various segments of the frame such as line, tile (block) and frame.

According to the present invention, FIG. 8 shows an illustrative implementation of the node-CE communication mechanism for the purpose of associating the nodes (50) to the compute engines (25). The main processor (11) configures a node to get associated with a compute engine (25). There could be multiple instances of the same compute engine functionality in the system. The association of node is made with the functionality of a compute engine (25) and not with the particular hardware of the compute engine (25). Many nodes (50) can have association for the same compute engine functionality. All nodes (50), based on configuration settings, can send processing requests to any compute engine (25) by arbitration. The arbiter manages time multiplexing of compute engine execution. On receiving compute request messages, compute engines start execution. They keep the busy status as high for informing that it cannot accept further requests until the current process is over. The execution is based on set of instructions, parameters and data pointers set by the main processor (11). Each node(50) will have a configuration area in internal memory (15) programmed by the main processor (11), which contains information needed for accessing the compute engine instructions, parameters and data pointers. In this way, if the compute engine (25) receives a processing request, it will be able to access these information and customize its actions for that node. By doing this, same compute engine (25) can behave differently based on the node from which an execution request is originating. It helps to reuse and reconfigure the compute engines (25) within the system by time multiplexing of their processing bandwidth. Thus, during the execution, the compute engine (25) will be in a context of the node which requested the execution.

FIG. 9 shows the fields of a node-CE message. It contains source node information and parameters associated with the data segment for processing. The attributes will include information such as edge tile, central tile, etc. The source node field help compute engines (25) to load appropriate configuration settings, input data location, output data location, execution instructions and other parameters from the data locations associated with the source node that is making the request. The attributes help the compute engine (25) to identify the dynamic parameters of the data segments being processed and handled accordingly. The completion message contains destination node ID and execution status information.

According to FIG. 10, it shows an example of a data processing flow established in the present invention. Such a processing flow is programmed by the main processor (11) based on the application software requirements. Once such a processing flow is established, the compute engines (25) figured in the execution pipeline will work on the input data and make desired outputs that flow between various blocks of the system. The main processor (11) programs appropriate number of nodes to establish a graph like relation between them. There could be many such execution pipelines established in the system by forming such graphs. A node can have multiple fan-ins (inputs from other nodes/DMAs) and multiple fan-outs (outputs to other nodes/DMAs). Each node will be programmed to associate with the compute engine (25) that implements single/multiple functions, thus acting like a proxy. A compute engine (25) can have association with multiple nodes of execution pipelines allowing reuse of compute engine (25) within the system. The compute engine (25) will be time-multiplexed based on arbitration rules if it has one-to-many relation with multiple nodes(50). There is a mechanism used in the present invention to configure a compute engine (25) differently based on the nodes (50) issuing processing requests. But one node can have only one usage within the system during a time interval or context. Once node-node relations and node-kernel relations are established within the system by configuration settings by main processor (11), the execution can get started based on run-time data. The nodes (50) are responsible for establishing a producer-consumer relation between compute engines (25) and managing request and completion of individual functions by exercising the data flow management.

FIG. 11 shows an illustrative example of a detailed view of the data processing flow established by the present invention. In this illustration, a multi-graph configuration is established. Here all the three graphs (A, B and C) and associated node/compute engine pairs work in concurrency. The configuration has different granularities of data block handled by the pipeline as programmed by the application running in the main processor (11). In the graph (A), the processing pipeline contains mixed granularity with line-level granularity for nodes 2, 3 and 4 (and associated compute engines) and block (tile) level granularity for nodes 0, 5 and 6 (and associated compute engines). In the graph (B), all nodes (7 and 8) have block (tile) level granularity of processing. In the graph (C), all nodes (9 and 10) have frame level granularity for data for processing.

In FIG. 12, it shows an example of the parallel processing flow created by main processor (11) through configuration of nodes(50), compute engines (25) and PDMAs (26). The input data is a two dimensional data from a source like camera (14), peripheral I/O (13), main processor (11) or another graph in the system (10). The data could be residing in the main memory (12). Those skilled in the art would appreciate that the present teachings can be directly applied to other dimensions, data sources, data locations, messaging schemes, arbitration schemes, message encoding and handshaking mechanisms.

The main processor (11) configures nodes(50) in such a way that for each participating node and PDMA (26), it defines the node ID to which it should listen for inter-node messages, thus establishing a producer-consumer relationship between all the participating nodes and PDMAs (26).

Referring to FIG. 12, in the current illustration of the method, PDMA0 is programmed to move the input data from main memory (12) to internal memory (15). PDMA0 is programmed to be a producer for node0. Node0, is a producer for two nodes (1 and 6), node1 is a producer for two nodes (2 and 4), node3 is configured to be a multi input node with two nodes (2 and 4) as producers, node5 is configured to be a multi input node with two nodes (6 and 3) as producers and PDMA1 is programmed to be connected to producer node (54) and responsible for moving the node5 output to main memory (12).

The main processor (11) also configures compute engine functionality IDs to the nodes (50) to establish a node-to-compute engine association. It is important to notice that this is a static configuration throughout the life of the graph. These configurations are done only to the involving nodes (50) and PDMAs (26) only. There could be multiple instances of the same compute engine functionality in the system. A node's association is with a compute engine functionality, not to a particular compute engine hardware. The main processor (11) also stores configuration settings and instructions for the compute engines (25) in the internal memory (15) address linked to the node IDs. All the compute engines (25) will have the knowledge to derive the address of locations based on the requesting node-IDs using a node-ID to configuration address mapping programmed by the main processor (11). The main processor (11) also configures PDMAs (26) with data structure in the main memory (12), links for sequencing data automatically, format of the frame such as width, depth, tile dimensions, data segment granularity etc. It also programs the PDMAs (26) to interrupt itself on desired timing points, such as end of frame etc. So that the main processor (11) can also involve in the data processing flow when desired.

In the current illustration, as shown in FIG. 12, main processor (11) configures node0 with kernel0 compute engine functionality ID, thus establishing a virtual association of compute engine functionality to the node. Similarly it configures node1 with kernel1, node4 with FixedFunction0, node2 with kernel1, node3 with kernel2, node6 with SIMD0 and node5 with SIMD1 compute functionalities. Thus a group of heterogeneous compute engine functionalities are getting attached to a processing pipeline data flow controlled by data sequencing facilitated by physical nodes (50). One can notice that a node's association is with a compute engine functionality, not to the physical hardware of a particular compute engine (26).

After all the configurations are done by the main processor (11), it can trigger runtime operation of the heterogeneous compute pipeline (20) whenever it desires. Once run time operation is triggered, based on the configuration set by the main processor (11), PDMA0 will start moving the input data to the graph by transferring data segments from main memory (12) to internal memory (15) in segments. The data segments could be lines, tiles or frames based on granularity of processing programmed by the main processor (11). In the present illustration as in FIG. 12, it is a tile based data processing. In this illustration, various tile have reached different pipeline stages. The frame in the illustration has 64 tiles, Tile0, Tile1 to Tile63. As shown in FIG. 12, the PDMA0 is moving Tile4 of the frame1 from main memory (12) to internal memory (15) by requesting data mover (DM) (23) through PDMA-DM fabric (24). Then, it issues a commit block message to node0 by sending a broadcast message on inter-node message fabric (30). Once the data mover operation is completed and there is a tile data credit available from the node0. As node0 is programmed to be listening to PDMA0 message, it accepts this as a valid data flow message. Other nodes are ignore this PDMA0 message, as for them, PDMA0 is not a producer, per their configuration. During the same time while PDMA0 is moving Tile4 to the next block in the pipeline, node0 processing the previous tile from PDMA0, i.e. Tile3, using its associated compute engine functionality, Kernel0, by issuing compute request command to the compute engine fabric. Once the Kernel0 processing is over, the node0 will release the tile data credit to PDMA0 by sending release tile message over the inter-node message fabric (30). PDMA0 can use this information to flow control next segments of data to be produced to node0. Also, node0 will issue a commit message to the next blocks in the pipeline, node1 and node6.

In the present illustration as given in FIG. 12, node1 using its associated compute engine functionality, Kernel1, for processing node0 processed output of Tile2. Similarly node6 is using its associated compute engine functionality, SIMD0 for processing Tile2. One can notice that, while node1 and node6 are processing Tile2 based data, the node2 and node4 are waiting for node1 commit message. And node3 (multi-input node) is waiting for node2 and node4 commit messages. Node5 (multi-input node) is processing on Tile1 based data previously committed by node3 and node6. Node5 will not start processing a new tile, until Tile2 based processing is completed by node3 and node6 and they issue commit messages and its own processing of Tile1 based data is complete. The PDMA1 is moving the Tile0 based previous output from node5 to the main memory (12). One can notice that a multi-input node will wait for all its producer nodes (54) to complete the data segments (of its own producer granularity) before it issues a compute request to its compute engine (25). Example, node3 will not issue a kernel2 compute request until it receives commit of tile messages from both node2 and node4. Thus all nodes (50) of the graph are executing concurrently on pipelined segments (tiles) of a frame to achieve parallelism using heterogeneous compute engines (25). There are additional messages like start of frame at the beginning (before the first tile) issued by PDMA0 to inform the next block in the pipeline that it is starting a new frame. Similarly there is a commit frame message to indicate that it has completed all the lines and Tiles of the present frame. Rest of the blocks in the graphic pipeline propagate this information by repeating the message over the message fabric to the next blocks in the pipeline. Once last block in the pipeline PDMA1 receives commit frame messages and all intended operations are completed, it will issue a completion hand-shake with main processor (11) by issuing interrupt. The main processor (11) can chose to intervene and complete rest of the processing for the frame or it can program the PDMAs (26) to automatically pick up the next frame and continue execution.

FIG. 13 shows a compute engine structure with I/O (Input/output) blocks for the purpose of grabbing run time data from memory, storing results in memory, grabbing control information and instructions from memory and interface for communicating with nodes. The core consists of main computational block such as SIMD/VLIW processor or a convolution kernel. The RDMA is a DMA engine responsible for moving data from memory to the compute engine (25) for the purpose of execution. The WDMA is a DMA engine responsible for moving processed data to memory after processing. Node-CE fabric interface interacts with the node-CE fabric (40) to accept new execution requests and return computation status. The configuration control block is responsible for grabbing instructions and configuration information that is relevant for the execution request based on the node ID which requesting the computation.

FIG. 14 illustrates two methods through which the system can be implemented and used. The method described in FIG. 14A shows a traditional approach of physical implementation in which the hardware system designer starts implementation of a parallel processing system (20) by collecting general requirements from the product specification. It gets implemented in an FPGA/ASIC using design flows. And the application developer develops an application understanding the device capabilities by programming graphs and data flows associated with the application and algorithms. Then once he start the system, the program configures the device to establish graph and make compute engines (25) and nodes (50) ready for processing the incoming data. And once run time operation starts, the system process the data and give results back.

Alternatively the second inventive method (B) as described in FIG. 14B could be applied in which the implementation requirements are gathered from the application developers design entry information through an extraction step with the help of a compiler. During this design extraction phase, the compiler gathers information about the resources such as type of compute engines (25), number of nodes, memory and number of PDMAs required for the application, and accordingly generates a definition file. This definition file will be used by the physical implementation phase (FPGA/ASIC) to map the design in to the physical device. Rest of the phases are similar to the approach (A). Thus using the inventive method (B), application developer can make implementation definition file without deep understanding of device physical design. The definition file will be used by the physical implementation tools along with other RTL files to appropriately pick and configure design library components and map them to device libraries for implementation. Thus the physical designer will be able to develop a device that suits the application requirements.

The system allows high degree of parallel processing with minimal programming overhead and complexity. It provides a simple, but powerful parallel execution pipeline generation. The system and methods allow high degree of reuse of compute engines (25) for the purpose of image and vector processing. The system allows simple graph based programming model, i.e., using a simple graph interconnectivity programming, the application developer can offload data flow control to the nodes, thus allowing minimal control operations within main processor (11) and compute engines (25) during run time operation. Traditional processor communication based schemes are slow to achieve this level of parallel processing. This allows hardware acceleration of image and vector processing.

Thus, the system and method is useful for image, video and similar data that demands high degree of parallel processing to achieve performance. The invention finds direct application in products in computer vision, artificial intelligence, video encoding/decoding, data analytics and other domains that demands high performance data processing at low power. Another advantage of the present invention is an application developer can make implementation definition file without deep understanding of device physical design.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A system to interconnect heterogeneous compute resources using graph based execution flow for image and video processing, comprising:
   a. a main processor (11) to implement system bring up, configuration of the entire system, main operating system software execution, application software and overall control of the system;
   b. plurality of main memory units (12) to hold data for various processing and peripheral blocks;
   c. plurality of peripheral input/output units (13) to implement input/output functions;
   d. plurality of camera units (14) to acquire visual images and videos based on application requirement;
   e. an internal memory (15) to store data, configuration information and instructions for compute engines temporarily;

f. a subsystem fabric (16) to provide communication between various units in the system; and g. a heterogeneous parallel processing system (20) to execute the data based on a data flow pipeline set by the main processor (11); wherein, a group of physical nodes (50) to act as proxy nodes for a group of compute engine functionalities and arranging the proxy nodes in a pipeline data processing flow, wherein i. a virtual pipeline topology is established by configuring participating proxy nodes, using data flow messages sent over a broadcast channel by the participating proxy nodes and appropriately filtering and processing the data flow messages by receiving nodes;

ii. a node configuration procedure to associate a particular compute engine functionality to a participating node; and iii. the participating node to accept multiple input nodes and multiple output nodes, to create complex graphs, a group of compute engines (25) to honor the compute requests from said proxy nodes, complete execution and provide status back to said proxy nodes, wherein i. the group of physical nodes (50) to associate with a compute engine (25) that implements single/multiple functions to act as a proxy;

ii. the single/multiple functions for said compute engines (25) to serve said proxy nodes in a time multiplexed manner through arbitration and message exchanges;

iii. arbitrating a pool of homogeneous compute engines (25) with same functionality identification number to avail an instance of the functionality to a proxy node of the proxy nodes; and iv. said compute engine (25) gather configuration settings, parameters, instructions and data required to complete all compute operations requested based on the identity of said proxy node requesting the compute operations, a group of direct memory access engines and processor direct memory access units (26) to get attached to certain participating nodes and move data between the main memory (12) and the internal memory (15), wherein i. the main processor (11) to configure a processor direct memory access unit (26) to be part of a graph pipeline by attaching it to one of the physical nodes (50) in the pipeline;

ii. the processor direct memory access unit (26) to send and receive data flow messages so as to sequence data in a pipelined manner;

iii. the processor direct memory access unit (26) to communicate with data movers to initiate data transfers; and iv. the processor direct memory access unit (26) to handshake with said main processor (11) during end of complete data to keep said main processor (11) informed about the status of the pipeline and take appropriate actions.

2. The system as claimed in claim 1, wherein said compute engines (25) of heterogeneous nature includes fixed function hardware blocks to implement a mega function, kernel modules to implement specific general purpose micro functions and single instruction multiple data processors (SIMDs) or Very long instruction word processors (VLIW) to work based on instructions programmed for specific applications by participating in an execution pipeline.

3. The system as claimed in claim 2, wherein said participating nodes handle multiple granularity levels of data flow using mechanisms, wherein a. separate data flow messages are exchanged for each of the granularity levels for managing commit and release of input and output data buffers;

b. said participating nodes convert data granularities between inputs and outputs by accumulating or splitting data segments; and c. said participating nodes auto manage data flow sequencing based on completions of the data segments of different granularities within the pipeline.

4. The system as claimed in claim 3, wherein said data is image or video or processed versions of the same with pipeline data flow granularities, said pipeline data flow granularities are frame, tile and line.

5. The system as claimed in claim 1, wherein said processor direct memory access unit (26) arbitrates for a pool of data movers to time multiplex their available bandwidth in moving data between the main memory (12) and the internal memory (15).

6. A method to interconnect heterogeneous compute resources using graph based execution flow for image and video processing, comprising the steps of:

a. creating different types of graph based execution pipelines using a group of homogeneous physical node blocks that act as proxy nodes for said heterogeneous compute engines (25);

b. creating a communication scheme between said proxy nodes to establish graph relationship in data movement;

c. establishing data flow control scheme between said proxy nodes to aid pipelined processing with said compute engines (25) to work simultaneously on pipelined streams of data;

d. establishing a scheme to share said compute engines (25) within same execution graph or between different graphs allowing reuse of said compute engines (25);

e. working on various granularities of data by changing granularity between intermediate stages of the execution pipeline;

f. establishing a scheme to share processor direct memory access units as part of multiple graphs;

g. configuring and programming the processor direct memory access units, the proxy nodes (26) and said compute engines to work concurrently on run time execution;

h. allowing said compute engines (25) to get instructions and data based on the context or the proxy nodes requesting computation; and i. gathering physical implementation requirements from an application developer's design entry information.

7. The method as claimed in claim 6, wherein extracting resource information from the application developer's design entry information, said information being type of compute engines, number of compute engines, number of nodes, number of processor direct memory access and number of memory resources.

8. The method as claimed in claim 6, wherein generating a definition file to be used for physical implementation tools to pick and compile appropriate RTL files with appropriate parameters during design mapping.

* * * * *